United States Patent
Blankenship

(10) Patent No.: US 10,811,943 B2
(45) Date of Patent: Oct. 20, 2020

(54) ELECTROMAGNETIC ROTARY MOTOR

(71) Applicant: Maxwell Jordan Blankenship, Fairbanks, AK (US)

(72) Inventor: Maxwell Jordan Blankenship, Fairbanks, AK (US)

( * ) Notice: Subject to any disclaimer, the term of this patent is extended or adjusted under 35 U.S.C. 154(b) by 134 days.

(21) Appl. No.: 16/252,550

(22) Filed: Jan. 18, 2019

(65) Prior Publication Data

US 2019/0173361 A1    Jun. 6, 2019

Related U.S. Application Data

(63) Continuation-in-part of application No. 15/369,151, filed on Dec. 5, 2016, now abandoned.

(51) Int. Cl.

| | | |
|---|---|---|
| *H02K 11/40* | (2016.01) | |
| *H02K 7/116* | (2006.01) | |
| *H02K 13/12* | (2006.01) | |
| *H02K 11/21* | (2016.01) | |
| *H02K 25/00* | (2006.01) | |
| *H02K 5/22* | (2006.01) | |
| *H02K 11/30* | (2016.01) | |

(52) U.S. Cl.
CPC ............ *H02K 13/12* (2013.01); *H02K 5/225* (2013.01); *H02K 7/116* (2013.01); *H02K 11/21* (2016.01); *H02K 11/30* (2016.01); *H02K 11/40* (2016.01); *H02K 25/00* (2013.01)

(58) Field of Classification Search
CPC ........ H02K 13/12; H02K 25/00; H02K 5/225; H02K 11/40; H02K 11/21; H02K 11/30; H02K 7/116
See application file for complete search history.

(56) References Cited

U.S. PATENT DOCUMENTS

| 3,703,653 | A | * | 11/1972 | Tracy | H02K 99/20 |
|---|---|---|---|---|---|
| | | | | | 310/24 |
| 8,058,628 | B2 | * | 11/2011 | Zywno | H01J 37/3174 |
| | | | | | 250/442.11 |
| 8,659,251 | B2 | * | 2/2014 | Amagasa | H02K 11/215 |
| | | | | | 318/400.38 |
| 9,997,979 | B1 | * | 6/2018 | Garrison | H02K 11/215 |
| 10,141,827 | B2 | * | 11/2018 | Ishak | H02K 99/20 |
| 2010/0263959 | A1 | * | 10/2010 | Hoebel | B62M 6/55 |
| | | | | | 180/443 |
| 2014/0252902 | A1 | * | 9/2014 | Binkowski | H02K 31/02 |
| | | | | | 310/156.08 |
| 2018/0072120 | A1 | * | 3/2018 | Hunter | B60G 3/01 |

* cited by examiner

*Primary Examiner* — Michael C Zarroli

(57) ABSTRACT

An electromagnetic rotary motor is an apparatus used to convert electrical energy into mechanical energy. The apparatus is also configured to utilize minimal electrical power input due to the arrangement of components and the cycle for energy conversion. The apparatus includes a drive shaft, an input terminal, an annular housing, a plurality of brushes, and a plurality of electromagnetic (EM) mechanisms. The drive shaft is a cylindrical extrusion that rotates about its axis. The input terminal is a connector which provides electrical potential to the plurality of brushes through the drive shaft. The annular housing is a ring-shaped enclosure that protects the components of the apparatus. The plurality of EM mechanisms is a set of electrical components that react to the influence of the plurality of brushes.

19 Claims, 7 Drawing Sheets

ELECTROMAGNETIC ROTARY MOTOR

The current application is a continuation-in-part (CIP) application of the U.S. non-provisional application Ser. No. 15/369,151 filed on Dec. 5, 2016.

FIELD OF THE INVENTION

The present invention generally relates to an energy conversion device. More specifically, the present invention is an electromagnetic rotary motor that utilizes induced magnetism to generate mechanical power.

BACKGROUND OF THE INVENTION

The relationship between electricity and magnetism has been explored through countless experiments, and several theories and equations have been developed to explore their interaction. The discovery that electricity could create magnetic fields, which could in turn create electrical currents, was among the greatest scientific breakthroughs of the past century. Following that discovery, induced electricity and magnetism have contributed to the skyrocketing of electronics production. Development of precision in controlling these principles has further resulted in an explosion of products and devices that exploit the relationship between magnetism and mechanical energy. This results in items which can translate or rotate as a response to the input of electrical energy and the conversion of that energy into magnetism. In particular, electric motors have been developed to fill this very need on a larger power production scale.

Such devices, however, have not yet been optimized for general use. Many of the motors developed using these principles rely on heavy rotors to generate large amounts of torque. These rotors tend to be heavy or sporting poor form factors, resulting in uneven motion and general inefficiency. Often, these motors are further specialized for use in vehicles and automobiles. Many motors that utilize electromagnetic induction are inaccessible for usage on small projects or items. What is needed is a motor capable of efficiently converting electrical energy into mechanical energy.

The present invention addresses this issue. The electromagnetic rotary motor accepts the input of electrical charge. This potential difference is sent through the rotor to a set of arms that extend from the rotor, opposite the electrical charge input. When a rotor arm touches a contact on the opposite wall, the charge transfers through the contact to a waiting coil. This coil generates a magnetic field, which pushes or pulls a magnet attached to the end of the relevant arm of the rotor. When the contact is engaged, magnetic force acts upon the rotor, increasing the velocity of the rotor. The momentum created carries the rotor arm to the next contact. This arrangement can utilize different patterns of electrical input in order to achieve different rotor speeds. Energy usage is made more efficient due to the minimized mass of the arms and the efficient energy conversion process, which minimizes required electrical input.

DETAILED DESCRIPTION OF THE INVENTION

All illustrations of the drawings are for the purpose of describing selected versions of the present invention and are not intended to limit the scope of the present invention.

Figure 6:
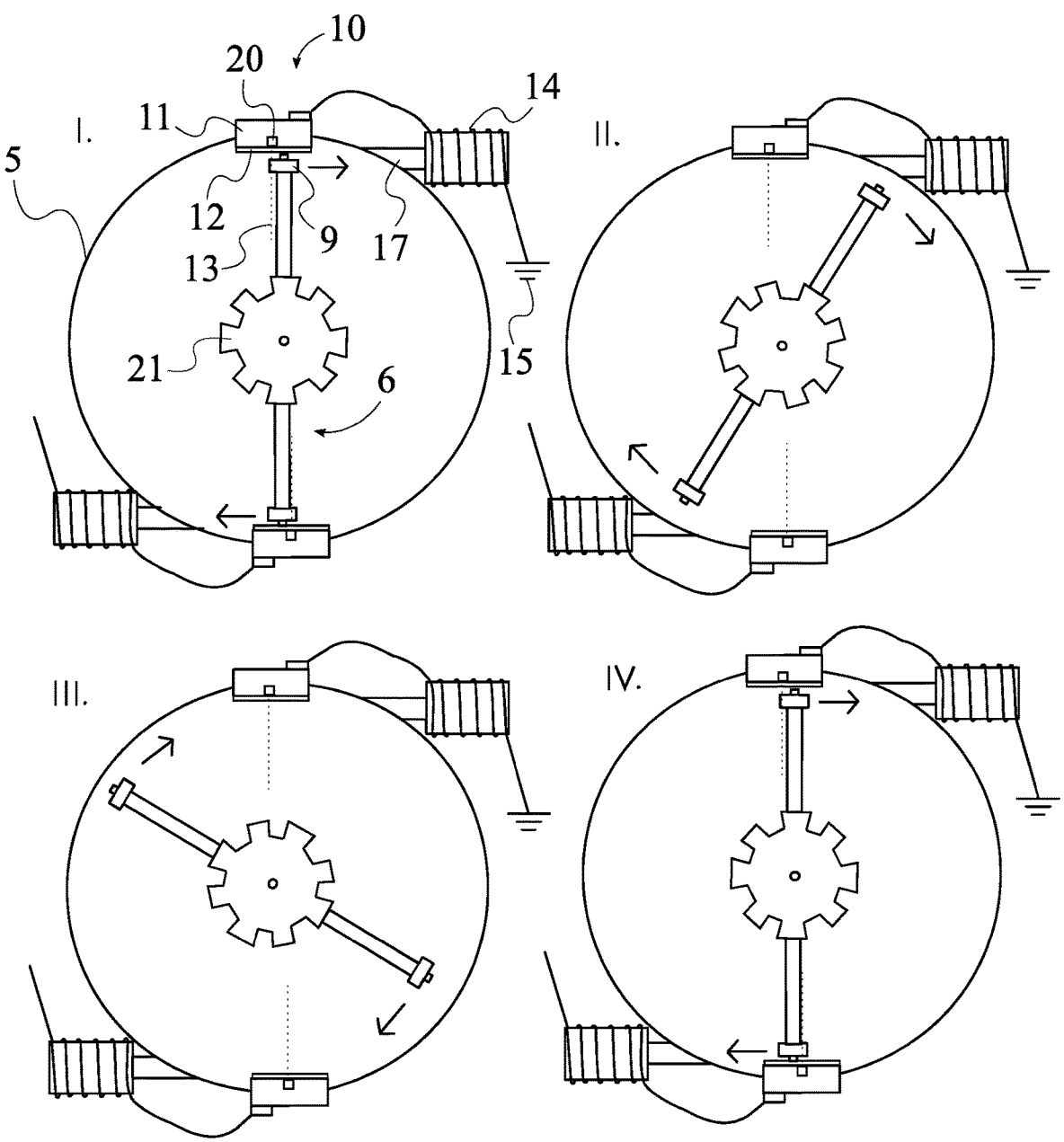
FIG. 6 is a schematic view representing the rotational motion of the plurality of brushes of the present invention.

The present invention is an electromagnetic rotary motor that is used to convert electrical energy into mechanical energy. The present invention is also configured to utilize minimal electrical power input due to the arrangement of components and the cycle for energy conversion. The present invention comprises a drive shaft 1, an input terminal 4, an annular housing 5, a plurality of brushes 6, and a plurality of electromagnetic (EM) mechanisms 10. The drive shaft 1 is a cylindrical extrusion that rotates about its axis. The input terminal 4 is a connector which provides electrical potential to the plurality of brushes 6 through the drive shaft 1. The annular housing 5 is a ring-shaped enclosure that protects the components of the present invention and helps to arrange the plurality of EM mechanisms 10. The plurality of EM mechanisms 10 is a set of electrical components that react to the influence of the plurality of brushes 6, as seen in FIG. 6. The drive shaft 1 comprises a first shaft end 2 and a second shaft end 3. The first shaft end 2 and the second shaft end 3 allow for arrangement of the drive shaft 1 relative to the input terminal 4 and the plurality of brushes 6. Each of the plurality of EM mechanisms 10 comprises a conductive contact 11, an EM coil 14, and a ground terminal 15. The conductive contact 11 is a metal unit which transfers electricity to the EM coil 14. The EM coil 14 is a conductive metal wire arranged in a helical shape to induce a strong, directed magnetic field. The ground terminal 15 is a connection that protects the present invention from experiencing dangerous electrical surges by providing a negative end to complete the circuit. Together, each of the plurality of EM mechanisms 10 has the ability to create a magnetic field from electrical input. Each of the plurality of brushes 6 comprises an arm 7, an output terminal 8, and a magnet 9. The arm 7 is a rigid extrusion that extends generally from the drive shaft 1. The output terminal 8 is an extension from the arm 7 that allows for transferal of electrical energy to the conductive contact 11. The magnet 9 is a rigid extrusion that allows for magnetic interaction between the plurality of brushes 6 and the EM coil 14.

Figure 1:
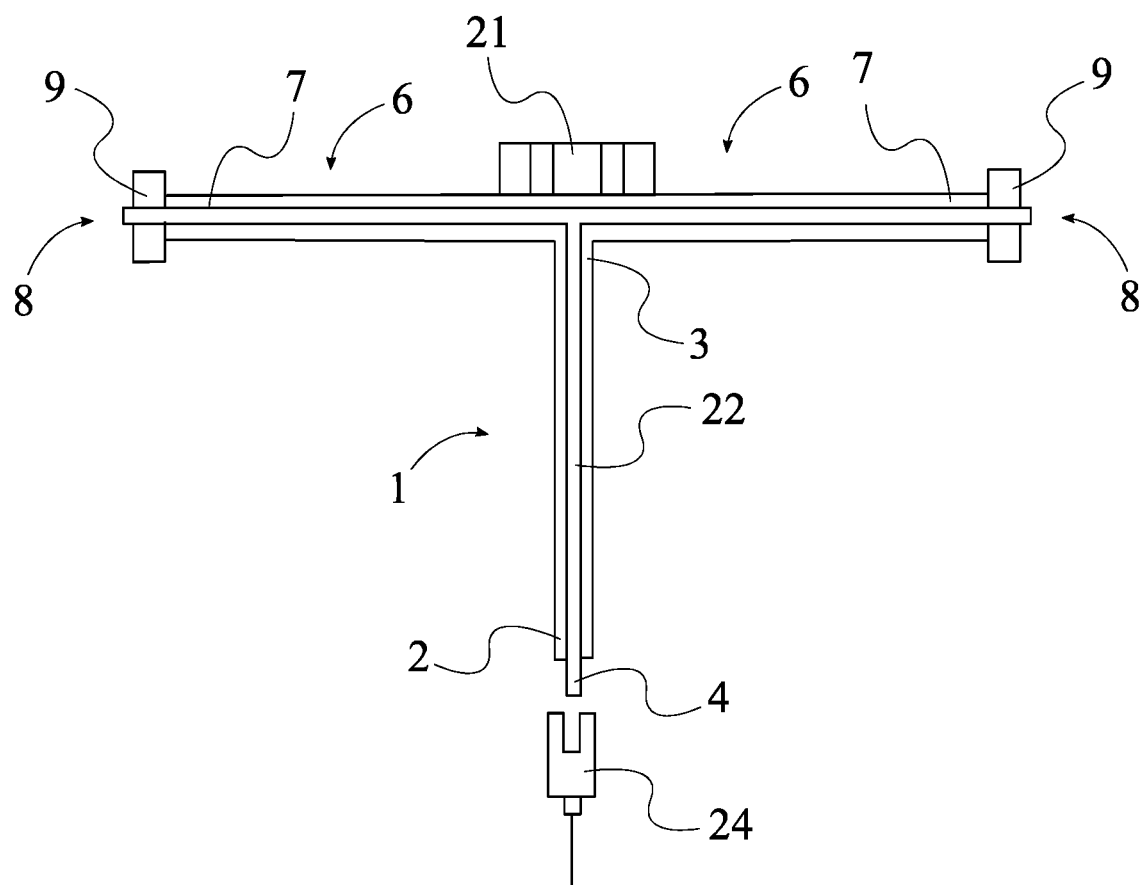
FIG. 1 is a front schematic view of the present invention.
Figure 2:
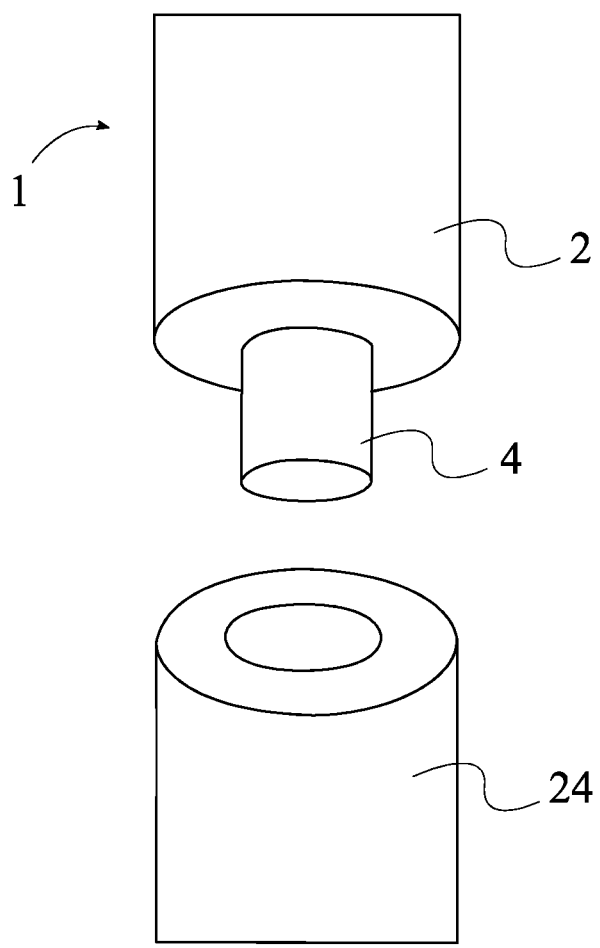
FIG. 2 is a detailed schematic view of the power adapter of the present invention.
Figure 3:
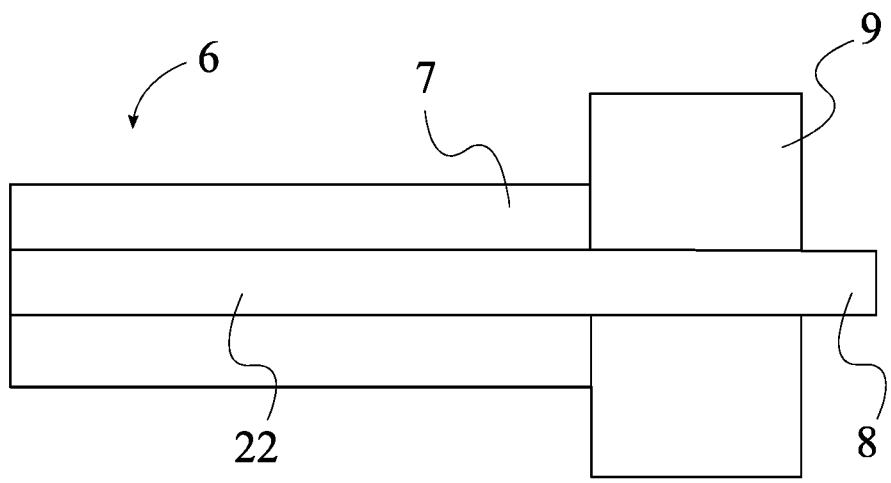
FIG. 3 is a detailed schematic view of the output terminal of the present invention.

The general configuration of the aforementioned components allows the present invention to efficiently and effectively convert electrical energy into mechanical energy. The drive shaft 1 is concentrically and rotatably mounted within the annular housing 5, as seen in FIG. 2. This arrangement allows the drive shaft 1 to spin freely relative to the annular housing 5. The input terminal 4 is mounted onto the first shaft end 2. In this way, electrical energy is transferred through the first shaft end 2 into the drive shaft 1. The plurality of brushes 6 is radially distributed about the drive shaft 1. The even distribution of the plurality of brushes 6 about the drive shaft 1 ensures that the drive shaft 1 is balanced while spinning. The second shaft end 3 is terminally connected to the arm 7. This arrangement results in each of the plurality of brushes 6 extending from the drive shaft 1. The output terminal 8 is terminally connected to the arm 7, opposite the second shaft end 3. In this way, the output terminal 8 is positioned generally away from the drive shaft 1, as seen in FIG. 1. The magnet 9 is laterally connected to the arm 7, adjacent to the output terminal 8, as seen in FIG. 3. This placement results in optimal torque generation for each of the plurality of brushes 6. The input terminal 4 is electrically connected to the output terminal 8. In this way, electricity traverses through the drive shaft 1 and the arm 7 to the output terminal 8. The plurality of EM mechanisms 10 is radially distributed about the annular housing 5. This arrangement allows the plurality of EM mechanisms 10 to interact with the output terminal 8 of each of the plurality of brushes 6. The conductive contact 11 is integrated into the annular housing 5. In this way, the conductive contact 11 is in position to transfer electrical energy upon contact by the output terminal 8. Further, the conductive contact 11 is electrically connected to the ground terminal 15 through the EM coil 14. This arrangement ensures stability of electrical potential through the EM coil 14 and the conductive contact 11.

Figure 7:
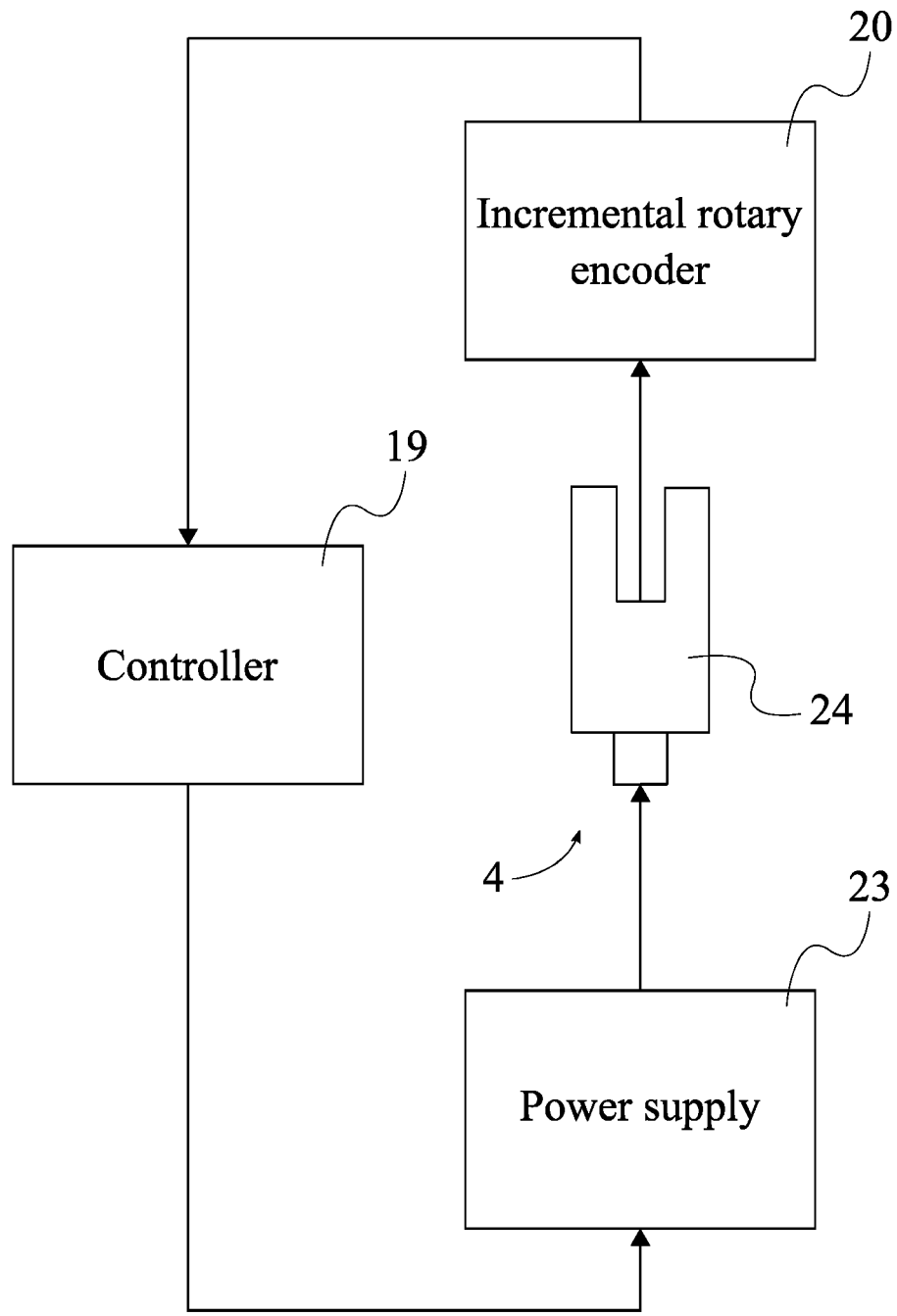
FIG. 7 is a process flow diagram depicting the arrangement of the controller of the present invention.

In order to control the amount of mechanical energy produced by the present invention, the present invention must be able to moderate pulses of electricity sent through the input terminal 4. To this end, the present invention comprises a controller 19 and an incremental rotary encoder 20. The controller 19 is an electrical signal regulator capable of determining the amount of electrical energy delivered through the input terminal 4. The incremental rotary encoder 20 is a sensor capable of determining the presence of a magnetic field. The incremental rotary encoder 20 is operatively coupled to the magnet for each of the plurality of brushes, wherein the incremental encoder is used to track a rotation of the magnet for each of the plurality of brushes about the drive shaft 1, as seen in FIG. 7. This arrangement allows the incremental rotary encoder 20 to measure data relevant to determining the rate of rotation of the plurality of brushes 6. The incremental rotary encoder 20 is electronically connected to the controller 19. In this way, the data registered by the incremental rotary encoder 20 is subsequently processed by the controller 19, which can then utilize that information to moderate electrical flow through the input terminal 4.

Figure 5:
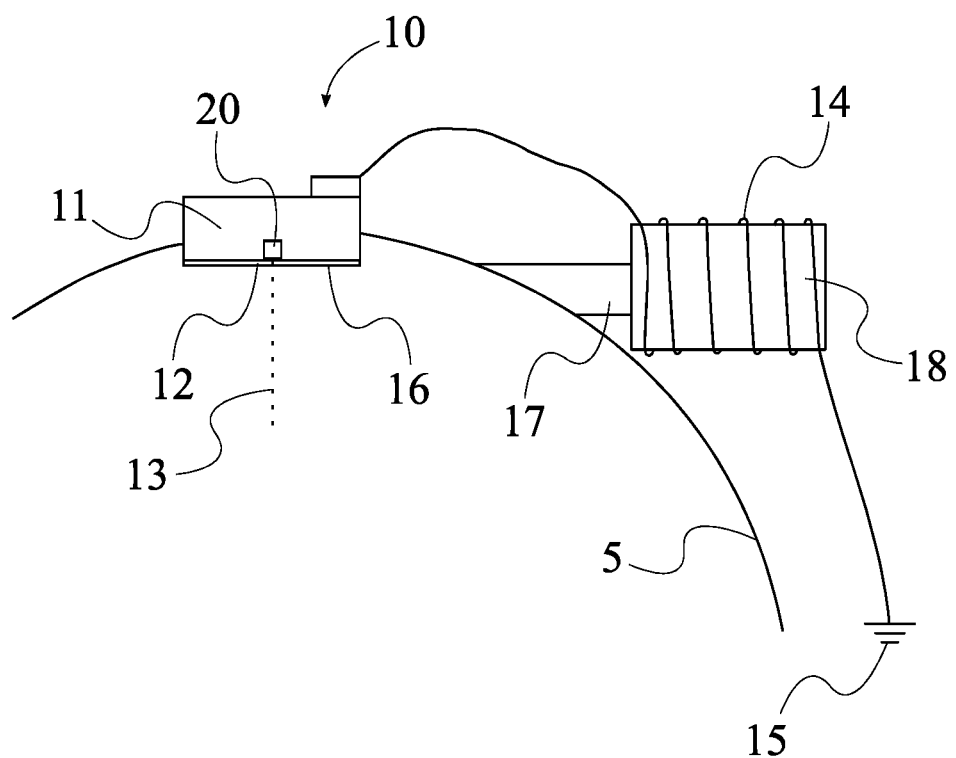
FIG. 5 is a detailed top schematic view of an EM mechanism of the present invention.

The present invention relies upon the interaction between the magnet 9 and the EM coil 14. To this end, the conductive contact 11 comprises an interaction surface 12. The interaction surface 12 is a generally flat surface, as seen in FIG. 5, upon which the output terminal 8 contacts the conductive contact 11 while rotating. The interaction surface 12 is oriented toward the drive shaft 1. This arrangement results in the interaction surface 12 being positioned optimally for contact with the output terminal 8. A normal axis 13 of the interaction surface 12 is positioned perpendicular to a magnetic-field direction 141 of the EM coil 14. In this way, the EM coil 14 is optimally positioned towards the magnet 9. Furthermore, a magnetic-field direction 91 of the magnet 9 is oriented perpendicular to the arm 7. This arrangement allows for interaction between maximized strengths of the magnetic fields created by the magnet 9 and the EM coil 14.

The present invention operates differently between different configurations of the plurality of brushes 6 relative to the plurality of EM mechanisms 10. To this end, it is sensible to define a scenario wherein the plurality of brushes 6 and the plurality of EM mechanisms 10 are arranged in a rotationally-driven configuration, as seen in FIG. 6. In such a configuration, forces are applied to the magnet 9 to increase the rotational velocity of the drive shaft 1. The output terminal 8 for each of the plurality of brushes 6 is in electrical communication with the conductive contact 11 for a corresponding EM mechanism from the plurality of EM mechanisms 10. This arrangement results in the transfer of electrical energy to the EM coil 14, which responds by generating a magnetic field. The magnet 9 for each of the plurality of brushes 6 is in magnetic communication with the EM coil 14 for the corresponding EM mechanism. Furthermore, a magnetic-field direction 91 of the magnet 9 for each of the plurality of brushes 6 is oriented colinear to a magnetic-field direction 141 of the EM coil 14 for the corresponding EM mechanism. In this way, when the output terminal 8 touches the conductive contact 11, the magnet 9 is in optimal position to be repelled away by the magnetic field 141 of the EM coil 14.

Figure 4:
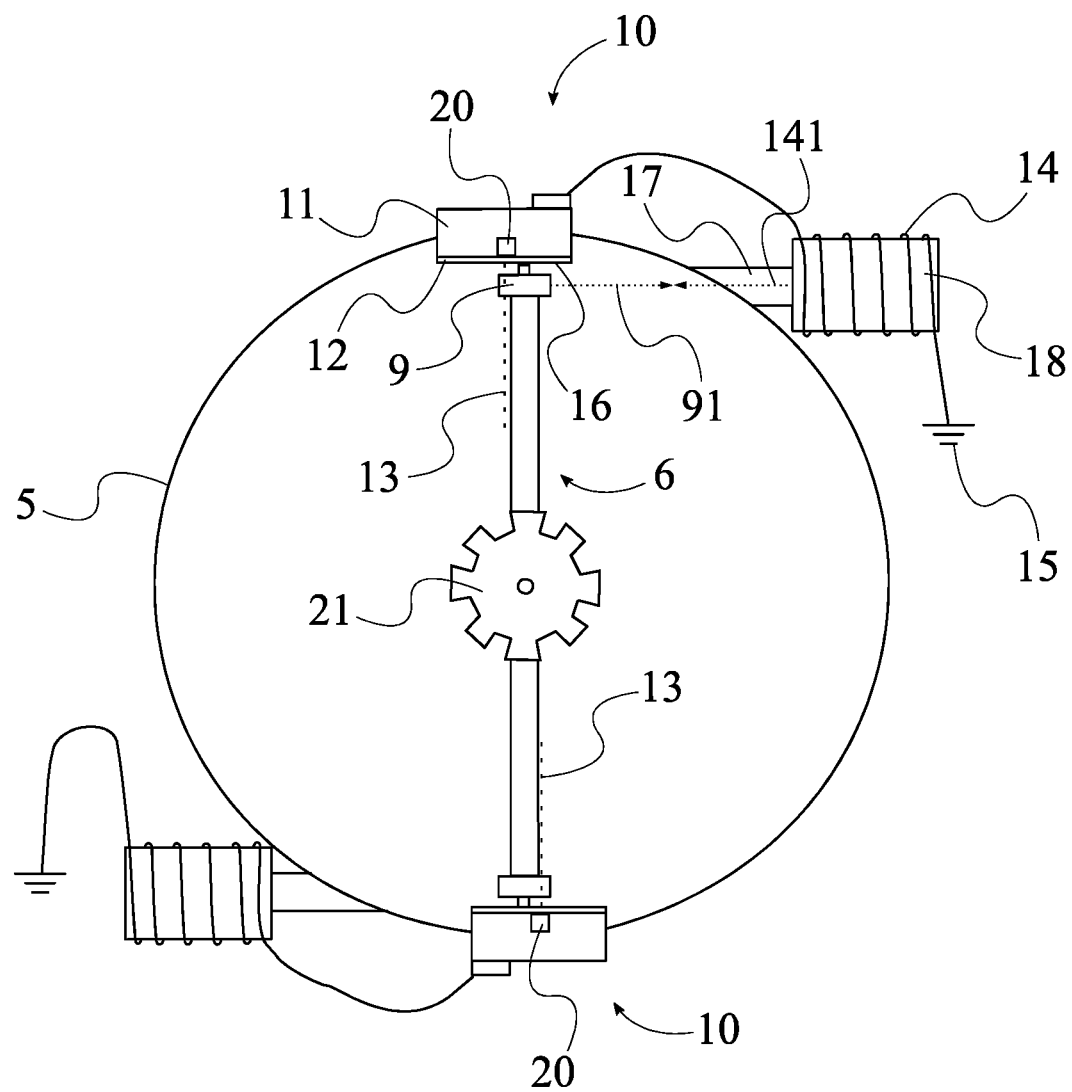
FIG. 4 is a top schematic view of the present invention.

Several optimizations may further enhance the efficiency and ease-of-use of the present invention. Among those improvements, each of the plurality of EM mechanisms 10 comprises a conductive lubricant layer 16. The conductive lubricant layer 16 is a film that lubricates the interaction surface 12 between the conductive contact 11 and the output terminal 8, as seen in FIG. 4. The conductive lubricant layer 16 is applied across the interaction surface 12. This arrangement reduces energetic losses due to friction and heat without sacrificing the ability of the output terminal 8 to transfer electrical power. Another optimization requires ease of transferal of generated power to adjacent mechanisms. To this end, the present invention comprises a power output mechanism 21. The power output mechanism 21 is a gear or other mechanical unit capable of improving energy transfer from the present invention. The power output mechanism 21 is torsionally connected to the second shaft end 3. In this way, the power output mechanism 21 is positioned conveniently away from the plurality of brushes 6, therefore preventing interference between the power output mechanism 21 and the rotation of the plurality of brushes 6.

The present invention further requires electrical and mechanical components that assist in the arrangement of the plurality of EM mechanisms 10 and the ease of transfer of electrical energy. To this end, the present invention comprises a conductive line 22. The conductive line 22 is a conductive core that allows for optimal electrical flow from the input terminal 4 and the output terminal 8. The conductive line 22 traverses through the drive shaft 1 from the first shaft end 2 to the second shaft end 3. The conductive line 22 further traversing through the arm 7 of each of the plurality of brushes 6. This arrangement enables distribution of electrical power through the drive shaft 1 and each of the plurality of brushes 6. The input terminal 4 and the output terminal 8 are electrically connected to each other through the conductive line 22. This arrangement provides ample electrical energy for subsequent transmission to the conductive contact 11.

The present invention may further require the usage of internal electrical energy. To this end, the present invention comprises a power supply 23 and a power adapter 24. The power supply 23 is any of a variety of electrical potential storage devices. The power adapter 24 is a fixture that fits to the first shaft end 2. The input terminal 4 is rotatably connected to the power adapter 24. This allows the drive shaft 1 to rotate freely about the power adapter 24. The power supply 23 is electrically connected to the input terminal 4 through the power adapter 24. This arrangement allows electrical energy to transfer to the drive shaft 1 while the drive shaft 1 rotates.

Electrical energy transferred to the plurality of EM mechanisms 10 must travel to an appropriately-positioned EM coil 14 in order to properly affect the magnet 9, as seen in FIG. 6. Therefore, each of the plurality of EM mechanisms 10 comprises a nub 17 and a spool 18. The nub 17 is a protrusion extending away from the contact surface. The spool 18 is a cylindrical, preferably conductive unit that allows for winding of the EM coil 14. The spool 18 is mounted offset from the annular housing 5 by the nub 17. This allows the EM coil 14 to be in proper position relative to the plurality of brushes 6. The EM coil 14 is looped around the spool 18. In this way, the induced magnetic field is oriented appropriately for the magnet 9.

The diagram shown in FIG. 6 represents different phases of rotation for the plurality of brushes 6. The first image, depicted I, and the fourth image, depicted IV, shows the plurality of brushes 6 and the plurality of EM mechanisms 10 in a rotationally-driven configuration. In these configurations, electrical energy traverses into the EM coil 14, causing creation of the magnetic field 141. This magnetic field 141 interacts with the magnetic field 91 of the corresponding magnet 9 to create a magnetic force that turns the drive shaft 1. The second image, depicted II, and the third image, depicted III, show the shows the plurality of brushes 6 and the plurality of EM mechanisms 10 in a non-interactive configuration. The electrical energy cannot traverse into the EM coil 14, and the magnetic field 141 does not get created. In this configuration, the drive shaft 1 spins due to accumulated momentum.

Although the invention has been explained in relation to its preferred embodiment, it is to be understood that many other possible modifications and variations can be made without departing from the spirit and scope of the invention as hereinafter claimed.

What is claimed is:

1. An electromagnetic rotary motor comprises:
a drive shaft;
an input terminal;
an annular housing;
a plurality of brushes;
a plurality of electromagnetic (EM) mechanisms;
the drive shaft comprises a first shaft end and a second shaft end;
each of the plurality of EM mechanisms comprises a conductive contact, an EM coil, and a ground terminal;
each of the plurality of brushes comprises an arm, an output terminal, and a magnet;
the drive shaft being concentrically and rotatably mounted within the annular housing;
the input terminal being mounted onto the first shaft end;
the plurality of brushes being radially distributed about the drive shaft;
the second shaft end being terminally connected to the arm;
the output terminal being terminally connected to the arm, opposite the second shaft end;
the magnet being laterally connected to the arm, adjacent to the output terminal;
the input terminal being electrically connected to the output terminal;
the plurality of EM mechanisms being radially distributed about the annular housing;
the conductive contact being integrated into the annular housing; and
the conductive contact being electrically connected to the ground terminal through the EM coil.

2. The electromagnetic rotary motor as claimed in claim 1 comprises:
a controller;
an incremental rotary encoder;
the incremental rotary encoder being operatively coupled to the magnet for each of the plurality of brushes, wherein the incremental encoder is used to track a rotation of the magnet for each of the plurality of brushes about the drive shaft; and
the incremental rotary encoder being electronically connected to the controller.

3. The electromagnetic rotary motor as claimed in claim 1 comprises:
the conductive contact comprises an interaction surface;
the interaction surface being oriented towards the drive shaft; and
a normal axis of the interaction surface being positioned perpendicular to a magnetic-field direction of the EM coil.

4. The electromagnetic rotary motor as claimed in claim 1 comprises:
a magnetic-field direction of the magnet being oriented perpendicular to the arm.

5. The electromagnetic rotary motor as claimed in claim 1 comprises:
wherein the plurality of brushes and the plurality of EM mechanisms are arranged in a rotationally-driven configuration;
the output terminal for each of the plurality of brushes being in electrical communication with the conductive contact for a corresponding EM mechanism from the plurality of EM mechanisms;
the magnet for each of the plurality of brushes being in magnetic communication with the EM coil for the corresponding EM mechanism; and
a magnetic-field direction of the magnet for each of the plurality of brushes being oriented colinear to a magnetic-field direction of the EM coil for the corresponding EM mechanism.

6. The electromagnetic rotary motor as claimed in claim 1 comprises:
each of the plurality of EM mechanisms comprises a conductive lubricant layer;
the conductive contact comprises an interaction surface;
the interaction surface being oriented towards the drive shaft; and
the conductive lubricant layer being applied across the interaction surface.

7. The electromagnetic rotary motor as claimed in claim 1 comprises:
a power output mechanism; and
the power output mechanism being torsionally connected to the second shaft end.

8. The electromagnetic rotary motor as claimed in claim 1 comprises:
a conductive line;
the conductive line traversing through the drive shaft from the first shaft end to the second shaft end;
the conductive line further traversing through the arm of each of the plurality of brushes; and
the input terminal and the output terminal being electrically connected to each other through the conductive line.

9. The electromagnetic rotary motor as claimed in claim 1 comprises:
a power supply;
a power adapter;
the input terminal being rotatably connected to the power adapter; and
the power supply being electrically connected to the input terminal through the power adapter.

10. The electromagnetic rotary motor as claimed in claim 1 comprises:
  each of the plurality of EM mechanisms comprises a nub and a spool;
  the spool being mounted offset from the annular housing by the nub; and
  the EM coil being looped around the spool.

11. An electromagnetic rotary motor comprises:
  a drive shaft;
  an input terminal;
  an annular housing;
  a plurality of brushes;
  a plurality of electromagnetic (EM) mechanisms;
  a controller;
  an incremental rotary encoder;
  the drive shaft comprises a first shaft end and a second shaft end;
  each of the plurality of EM mechanisms comprises a conductive contact, an EM coil, and a ground terminal;
  each of the plurality of brushes comprises an arm, an output terminal, and a magnet;
  the drive shaft being concentrically and rotatably mounted within the annular housing;
  the input terminal being mounted onto the first shaft end;
  the plurality of brushes being radially distributed about the drive shaft;
  the second shaft end being terminally connected to the arm;
  the output terminal being terminally connected to the arm, opposite the second shaft end;
  the magnet being laterally connected to the arm, adjacent to the output terminal;
  the input terminal being electrically connected to the output terminal;
  the plurality of EM mechanisms being radially distributed about the annular housing;
  the conductive contact being integrated into the annular housing;
  the conductive contact being electrically connected to the ground terminal through the EM coil;
  the incremental rotary encoder being operatively coupled to the magnet for each of the plurality of brushes, wherein the incremental encoder is used to track a rotation of the magnet for each of the plurality of brushes about the drive shaft; and
  the incremental rotary encoder being electronically connected to the controller.

12. The electromagnetic rotary motor as claimed in claim 11 comprises:
  the conductive contact comprises an interaction surface;
  the interaction surface being oriented towards the drive shaft; and
  a normal axis of the interaction surface being positioned perpendicular to a magnetic-field direction of the EM coil.

13. The electromagnetic rotary motor as claimed in claim 11 comprises:
  a magnetic-field direction of the magnet being oriented perpendicular to the arm.

14. The electromagnetic rotary motor as claimed in claim 11 comprises:
  wherein the plurality of brushes and the plurality of EM mechanisms are arranged in a rotationally-driven configuration;
  the output terminal for each of the plurality of brushes being in electrical communication with the conductive contact for a corresponding EM mechanism from the plurality of EM mechanisms;
  the magnet for each of the plurality of brushes being in magnetic communication with the EM coil for the corresponding EM mechanism; and
  a magnetic-field direction of the magnet for each of the plurality of brushes being oriented colinear to a magnetic-field direction of the EM coil for the corresponding EM mechanism.

15. The electromagnetic rotary motor as claimed in claim 11 comprises:
  each of the plurality of EM mechanisms comprises a conductive lubricant layer;
  the conductive contact comprises an interaction surface;
  the interaction surface being oriented towards the drive shaft; and
  the conductive lubricant layer being applied across the interaction surface.

16. The electromagnetic rotary motor as claimed in claim 11 comprises:
  a power output mechanism; and
  the power output mechanism being torsionally connected to the second shaft end.

17. The electromagnetic rotary motor as claimed in claim 11 comprises:
  a conductive line;
  the conductive line traversing through the drive shaft from the first shaft end to the second shaft end;
  the conductive line further traversing through the arm of each of the plurality of brushes; and
  the input terminal and the output terminal being electrically connected to each other through the conductive line.

18. The electromagnetic rotary motor as claimed in claim 11 comprises:
  a power supply;
  a power adapter;
  the input terminal being rotatably connected to the power adapter; and
  the power supply being electrically connected to the input terminal through the power adapter.

19. The electromagnetic rotary motor as claimed in claim 11 comprises:
  each of the plurality of EM mechanisms comprises a nub and a spool;
  the spool being mounted offset from the annular housing by the nub; and
  the EM coil being looped around the spool.

* * * * *